(12) United States Patent
Appala et al.

(10) Patent No.: US 7,516,198 B1
(45) Date of Patent: Apr. 7, 2009

(54) ARRANGEMENT FOR PROVIDING CONTENT-BASED QUALITY OF SERVICE FOR A SERVICE FLOW BASED ON PARSING XML TAGS DETECTED FROM A SERVER RESPONSE TO A CLIENT REQUEST

(75) Inventors: Syam Sundar V. Appala, Santa Clara, CA (US); Sampath H. K. Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1527 days.

(21) Appl. No.: 09/984,414

(22) Filed: Oct. 30, 2001

(51) Int. Cl.
*G06F 15/16* (2006.01)

(52) U.S. Cl. .................. 709/219; 709/203; 709/217; 709/218; 709/223; 709/246; 709/247; 707/4; 715/234

(58) Field of Classification Search ......... 709/217–219, 709/203, 223, 246, 247; 714/38; 370/392; 707/4; 715/234
See application file for complete search history.

(56) References Cited

U.S. PATENT DOCUMENTS

| | | | | | |
|---|---|---|---|---|---|
| 5,678,010 | A | * | 10/1997 | Pittenger et al. ............... 705/44 |
| 6,091,724 | A | * | 7/2000 | Chandra et al. ............ 370/390 |
| 6,732,175 | B1 | * | 5/2004 | Abjanic ...................... 709/227 |
| 6,772,206 | B1 | * | 8/2004 | Lowry et al. ................ 709/223 |
| 6,801,604 | B2 | * | 10/2004 | Maes et al. ............. 379/88.17 |
| 6,804,717 | B1 | * | 10/2004 | Bakshi et al. ............... 709/225 |
| 6,847,999 | B1 | * | 1/2005 | Dodrill et al. ............... 709/225 |
| 6,850,948 | B1 | * | 2/2005 | Krasinski ................... 707/101 |
| 6,889,360 | B1 | * | 5/2005 | Ho et al. ..................... 715/513 |
| 6,922,411 | B1 | * | 7/2005 | Taylor ........................ 370/401 |
| 6,976,092 | B1 | * | 12/2005 | Daniell et al. ............... 709/246 |
| 7,065,706 | B1 | * | 6/2006 | Sankar ....................... 715/513 |
| 7,171,415 | B2 | * | 1/2007 | Kan et al. ..................... 707/10 |
| 2002/0038381 | A1 | * | 3/2002 | Gendron et al. ............ 709/238 |
| 2002/0122422 | A1 | * | 9/2002 | Kenney et al. ............. 370/392 |
| 2002/0161688 | A1 | * | 10/2002 | Stewart et al. ............... 705/37 |
| 2002/0161801 | A1 | * | 10/2002 | Hind et al. .................. 707/513 |

(Continued)

OTHER PUBLICATIONS

Sun et al. "XML-based MPEG-4 Vidoe Represenation and Applications." printed from <http://viola.usc.edu/newextra/Research/XiaomingSun/XiaomingSun.htm>.*

(Continued)

*Primary Examiner*—Alina N. Boutah
(74) *Attorney, Agent, or Firm*—Leon R. Turkevich

(57) ABSTRACT

A network node, for example a router, is configured for assigning network parameters for an identified flow of data packets associated with an application service, based on detecting quality of service parameters specified by XML tags within a message between an application server configured for providing the application service and a destination device configured for receiving the application service. The router includes an XML parser configured for parsing XML tags specifying prescribed user-selectable quality of service attributes for a corresponding application service, and an application resource configured for interpreting the prescribed user-selectable quality of service attributes for the application service. The application resource also is configured for assigning the selected network parameters, for transfer of the identified flow of data packets, based on the interpretation of the prescribed user-selectable quality of service attributes for the specified application service.

48 Claims, 3 Drawing Sheets

U.S. PATENT DOCUMENTS

| | | | |
|---|---|---|---|
| 2002/0170032 A1* | 11/2002 | Beaven et al. | 717/104 |
| 2002/0184373 A1* | 12/2002 | Maes | 709/228 |
| 2002/0198974 A1* | 12/2002 | Shafer | 709/223 |
| 2003/0023628 A1* | 1/2003 | Girardot et al. | 707/513 |
| 2003/0055818 A1* | 3/2003 | Faybishenko et al. | 707/3 |
| 2003/0081617 A1* | 5/2003 | Deng | 370/398 |
| 2003/0093717 A1* | 5/2003 | Mason | 714/38 |
| 2004/0043770 A1* | 3/2004 | Amit et al. | 455/450 |
| 2005/0240659 A1* | 10/2005 | Taylor | 709/217 |
| 2006/0200458 A1* | 9/2006 | Sankar | 707/4 |
| 2006/0288032 A1* | 12/2006 | Harris et al. | 707/101 |

OTHER PUBLICATIONS

Holub, Peter, XML Router Configuration Specifications and Architecture Document, CESNET Technical Report No. Jul. 2002, pp. 1-7, published Jun. 29, 2002.*

* cited by examiner

ARRANGEMENT FOR PROVIDING CONTENT-BASED QUALITY OF SERVICE FOR A SERVICE FLOW BASED ON PARSING XML TAGS DETECTED FROM A SERVER RESPONSE TO A CLIENT REQUEST

BACKGROUND OF THE INVENTION

1. Field of the Invention

The present invention relates to a router in an open protocol network configured for providing enhanced quality of service operations, for example high-bandwidth or low-latency routing, for an identified data flow from a server to a client.

2. Description of the Related Art

Networking communications technology is undergoing substantial changes in an effort to provide more content-rich services to consumers via a wide area network, such as the World Wide Web. For example, efforts are underway to provide guaranteed quality of service between a server and a client for bandwidth-intensive and latency-sensitive services, for example video on demand. To the extent that resources necessary for guaranteed quality of service may not be available via public wide area networks such as the World Wide Web, efforts are underway to deploy private wide area networks (e.g., content delivery networks) capable of delivering content for specialized services, for example video on demand, distance learning, etc. Such content delivery networks may be configured, for example, to provide MPEG-2 video data across 12 Mbps data links, although these content delivery networks may still utilize IP-based protocols, for example TCP/IP. Private networks also may be deployed for example by a regional network service provider in order to provide high-speed services to a residential or business community, overlaying the public wide area network; in such a case, a private network may provide an access point to the Internet for a private network subscribers, as well as local servers for localized services internal to the private network (e.g., local web hosting, secure online subscriber account management, localized caching of web content, etc.).

Regardless of whether the content is delivered via public or private wide area networks or some combination thereof, the existing techniques for end-to-end service realization typically have caused problems that affect scalability and limit flexibility. For example, one arrangement involves a source establishing a traffic engineered transmission path using out of band signaling mechanisms. Such an arrangement requires the establishment of a separate out of band signaling path, increasing the complexity of the delivery network and/or reducing available bandwidth for content delivery. For example, the Resource Reservation Protocol (RSVP) established by the Internet Engineering Task Force (IETF) Resource Reservation Setup Protocol Working Group (see RFC 2205) enables an RSVP session to be established between first and second end routers in order to reserve bandwidth; in particular, a first end router issues a resource reservation requests to a second router; the second router selectively grants the request based on the availability of the resource, and forwards the request to the next router in the path between the first and second end routers. The user traffic can then traverse the routers using the established RSVP session. Such an arrangement, however, creates additional processing requirements between the routers; moreover, it requires routers bandwidth to be allocated for a prescribed time interval, which may result in inefficient utilization of router resources.

Quality of service parameters also can be realized through configuration of a router for policy based routing on a traffic type basis using IP and TCP/UDP header information such as source IP address, destination IP address, port pairs, and protocol number. However, implementation of quality of service parameters based on these parameters suffers from the disadvantage that selection of traffic classification is limited to the port level, limiting flexibility for more advanced operations. For example, the selection of traffic classification cannot distinguish between multiple instances for the same user, for example in the case where a user may access the same application operation from a different device having different quality of service capabilities; in such case, the user would be unable to change quality of service parameters as desired. Different quality of service parameters also may be preferred based on user validation, for example a high-quality content subscriber may be entitled to a higher quality of service than a generic subscriber having paid for minimal service.

Additional problems with the limited selection of traffic classification arises with enforcement of other services such as security, mobile computing where an IP source address may be dynamically assigned, etc. Hence, existing techniques for traffic classification are inadequate for realizing quality of service parameters for application specific requirements, or user-specific requirements, either of which may change dynamically depending on the particular characteristics of the application service, the server providing the application service, or the user desiring to receive the application service.

SUMMARY OF THE INVENTION

There is a need for an arrangement that enables a network node, for example a router or a network edge device, to establish selected quality of service parameters for an identified flow of data packets associated with an application service, where the quality of service parameters are selected based on any application service attribute, application server attribute, subscriber attribute, and/or destination device attribute identified based on transactions associated with the application service between an application server configured for outputting the flow of data packets and a destination device configured for receiving the flow of data packets.

There also is a need for an arrangement that enables a router to establish selected quality of service parameters for an identified flow of data packets associated with an application service between an application server and a destination device, without the necessity of mediation between the router and either the application server or the destination device for the selected quality of service.

There also is a need for an arrangement that enables a router to establish selected quality of service parameters for an identified flow of data packets associated with an application service based on identifying the quality of service parameters from transactions between an application server configured for providing the application service and a destination device configured for receiving the application service.

These and other needs are attained by the present invention, where a network node, for example a router, is configured for assigning network parameters for an identified flow of data packets associated with an application service, based on detecting quality of service parameters specified by XML tags within a message between an application server configured for providing the application service and a destination device configured for receiving the application service. The router includes an XML parser configured for parsing XML tags specifying prescribed user-selectable quality of service attributes for a corresponding application service, and an application resource configured for interpreting the prescribed user-selectable quality of service attributes for the application service. The application resource also is configured for assigning the selected network parameters, for transfer of the identified flow of data packets, based on the interpretation of the prescribed user-selectable quality of service attributes for the specified application service.

Hence, a network node configured for transferring an identified flow of data packets between an application server and a destination device, for example a router, a gateway, an edge server, etc., is able to determine the quality of service parameters selected by a user for an application service, and implement the selected quality of service by assigning the selected network parameters for transfer of the identified flow of data packets associated with (i.e., providing) the application service. The detection of user-selected quality of service parameters based on client-server transactions enables the network node to select the network parameters without out-of-band signaling policy enforcement mechanisms. Moreover, selection of the network parameters enables the network node to minimize subsequent processing of the datapackets associated with the identified flow by caching the determined network parameters. If desired, the selected network parameters also may be forwarded to any other intermediate nodes along the path for the identified flow of data packets. Hence, the user-selected quality of service parameters can be implemented by distributing the selected network parameters to the intermediate nodes along the path of the identified flow.

One aspect of the present invention provides a network node configured for transferring an identified flow of data packets associated with an application service between an application server, configured for outputting the data packets, and a destination device configured for receiving the data packets. The network node includes a network interface configured for outputting the identified flow of data packets according to an open network protocol and based on selected network parameters. The network interface is configured for transferring between the application server and the destination device at least one message having XML tags specifying prescribed user-selected quality of service attributes for a corresponding application service. The network node also includes an extensible markup language (XML) parser configured for parsing the XML tags for the prescribed user-selected quality of service attributes, and an application resource. The application resource is configured for interpreting the prescribed user-selected quality of service attributes and selecting the selected network parameters based on the prescribed user-selected quality of service attributes, enabling the identified flow of data packets to be transferred for the application service according to the user-selected quality of service attributes.

Another aspect of the present invention provides a method in a network node configured for transferring a flow of data packets associated with an application service between an application server, configured for outputting the data packets, and a destination device configured for receiving the data packets. The method includes receiving, for transfer between the application server and the destination device, a message having XML tags specifying prescribed user-selected quality of service attributes for a corresponding application service, and parsing the XML tags for determining the prescribed user-selected quality of service attributes. The method also includes selecting network parameters, based on determining the prescribed user-selected quality of service attributes, enabling the flow of data packets to be transferred for the application service according to the user-selected quality of service attributes, and identifying and transferring the flow of data packets according to the selected network parameters.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
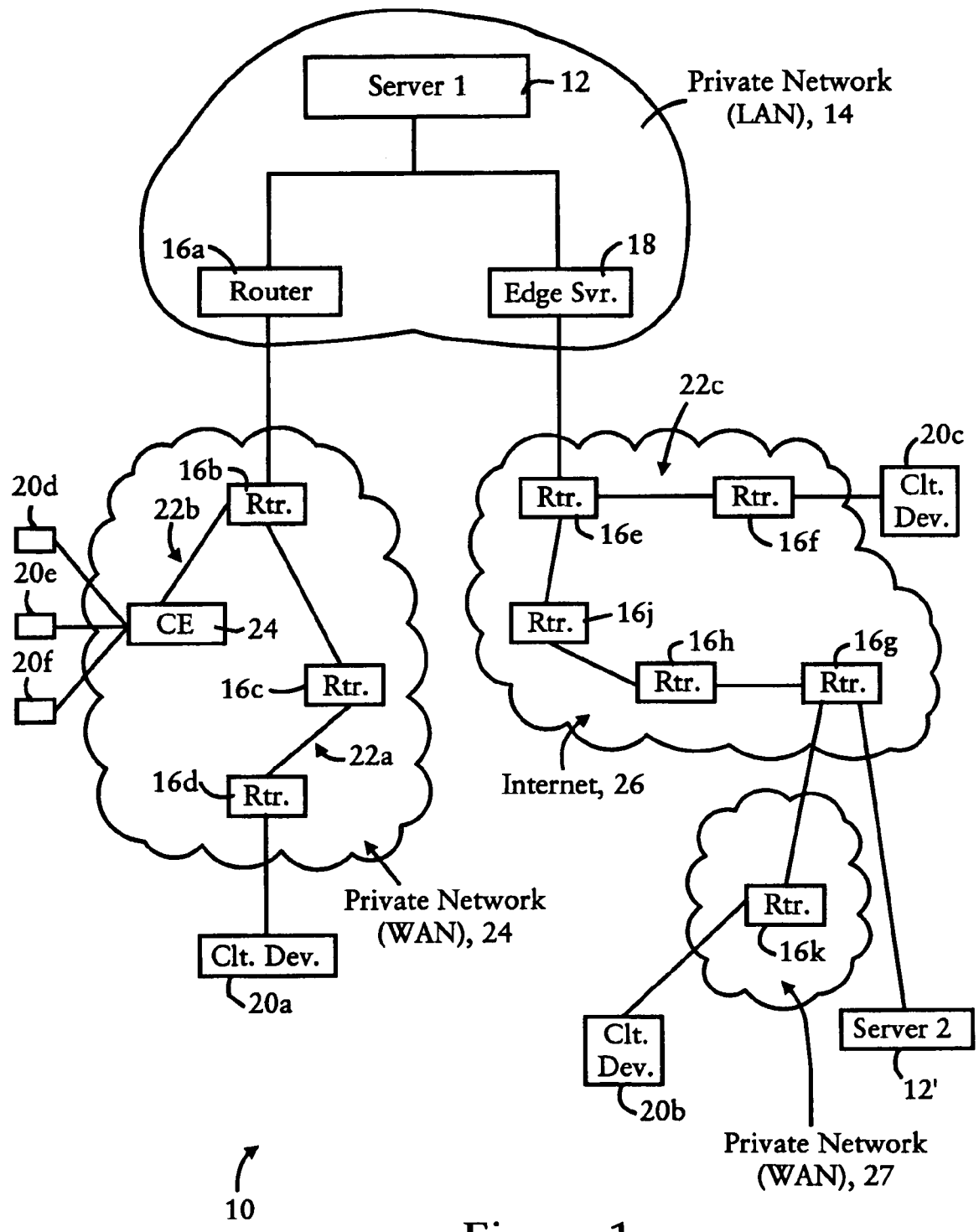
FIG. 1 is a diagram illustrating a networking arrangement enabling application services to be provided to a user according to user-selected quality of service attributes according to an embodiment of the present invention.

FIG. 1 is a block diagram illustrating a system 10 configured for delivering content-rich services to consumers by providing content-based quality of service using XML based classification and acceleration, according to an embodiment of the present invention. The system 10 includes an application server 12 configured for providing user-selected application services, for example high speed MPEG-2 video data for application services such as distance learning, video on demand, etc. As illustrated in FIG. 1 the server 12 may be associated with a local area network, which includes a router 16 and an edger server 18.

Figure 2:
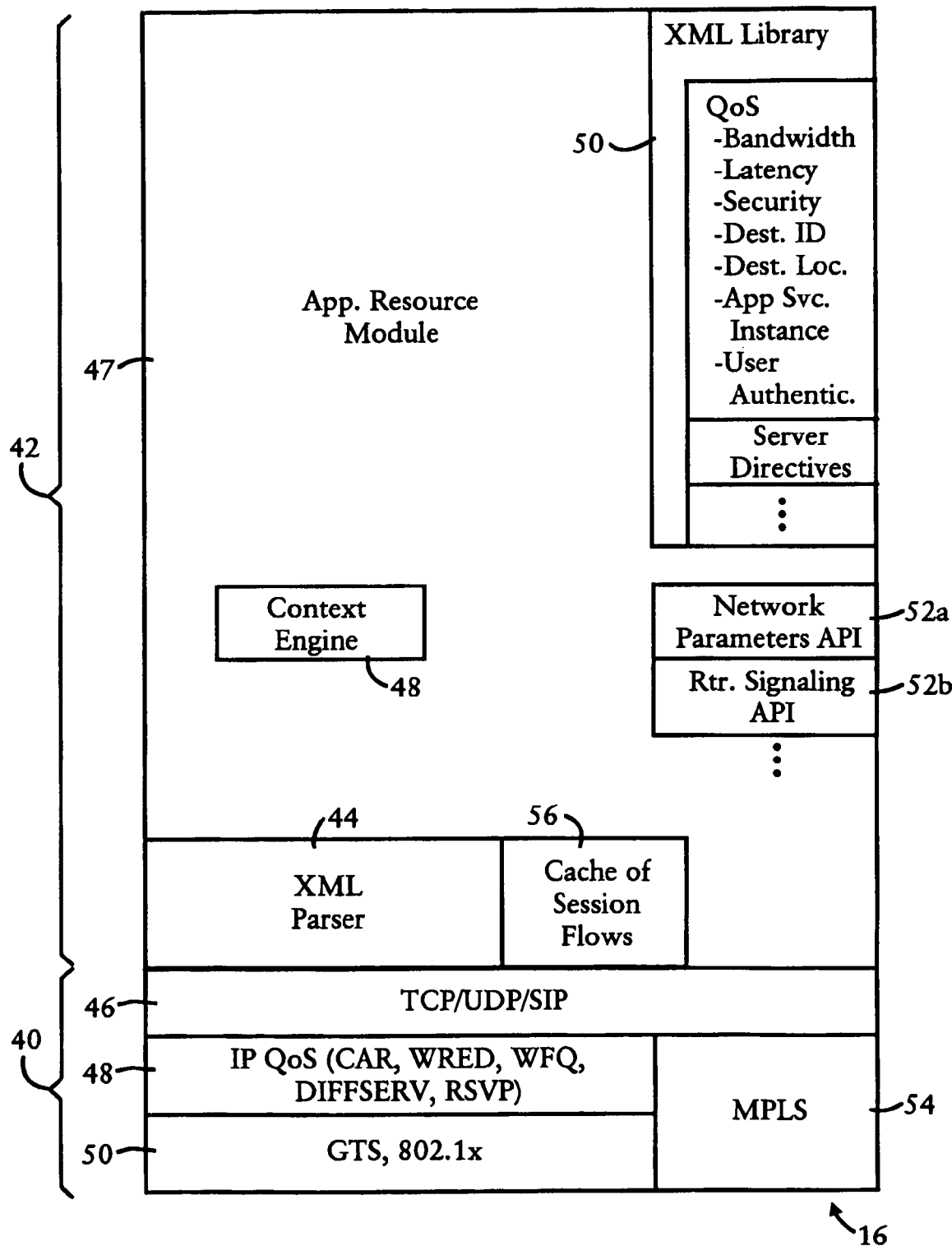
FIG. 2 is a block diagram illustrating a network node configured for providing XML based content classification and acceleration of an identified flow of data packets associated with an application service, according to an embodiment of the present invention.

The router 16, described in further detail below with respect to FIG. 2, is configured for routing the flow of data packets associated with the selected application service (e.g., the data packets carrying the MPEG-2 video data) according to specified quality of service attributes. In particular, the quality of service attributes specify the nature in which the flow of data packet needs to be transferred from the server 12 to a destination device for the application service. For example, a subscriber requesting premium service for a high quality video may request a 6 Megabit per second (Mbps) bandwidth channel with minimal latency to ensure full MPEG-2 video data quality on a high definition television; alternatively, a subscriber may request a lower grade of service, for example a 3 Mbps or 1.5 Mbps data link for reduced quality video streams, for example for viewing on a personal computer. Different application services also may require different quality of service requirements, depending on the nature of the application service: for example, a media stream for high quality audio requires substantially less bandwidth (e.g., 56 kilobits per second), although quality of service parameters (e.g., latency) are still relevant depending on the buffering capabilities at the client device.

Hence, application services may have different quality of service requirements, which may be specified in terms of user-selected quality of service attributes based on minimum bandwidth, maximum bandwidth, latency, security (e.g., encryption to prevent pirating); in addition, device-specific parameters such as destination device location, application service instance, and user authentication level may also affect quality of service requirements to the extent that a user may initiate separate instances for the same application service, where one instance is utilized for previewing a video, whereas the second instance is utilized for high quality feature presentation of the application service.

In addition, the server may establish its own set of quality of service requirements or attributes, also referred to as server directives. For example, the server 12 may determine that although the client device 20*a* is best served by receiving the data flow from the server 12, the client device 20*b* of the private network 27 may be better served by receiving the flow of data packets originating from the application server 12' based on geographic proximity; in this case, the server 12 may specify a server directive that certain destination client devices should have requests redirected to other servers that can more effectively realize the application services according to the desired quality of service parameters.

According to the disclosed embodiment, network nodes such as the router 16 and the edge server 18 are configured for determining the quality of service attributes for a corresponding application service, regardless of whether the quality of service attributes are selected by the server 12 or the client device 20. The network nodes realize the application service according to the requested quality of service attributes by selecting network parameters based on the selected quality of service attributes, and identifying and transferring the flow of data packets associated with the application service according to the selected network parameters. In addition, the identification of the flow of data packets and the corresponding selection of network parameters is cached locally within the network node 16 and/or 18, and forwarded to each network node along the path 22 utilized for transferring the identified flow of data packets between the application server and the destination device. Hence, upon determining the quality of service attributes for an application service, the network node 16 and/or 18 selects the network parameters necessary for transferring the identified the flow of data packets associated with the application service according to the selected quality of service, and forwards the identified parameters to each router along the path 22 used for transferring the identified flow of data packets between the application server 12 and the client device 20.

As illustrated in FIG. 1, the server 12 may be configured for transferring a flow of data packets associated with an application service (e.g., a full length movie) to a destination device, illustrated in FIG. 1 as either a client device 20, or a content engine (CE) 24. For example, a path 22*a* is established for the flow of data packets to the client device 20*a* via the routers 16*a*, 16*b*, 16*c*, and 16*d*. Hence, the router 16*a*, upon determining the necessary network parameters for providing the flow of data packets from the application server 12 according to the user-selected quality of service parameters, provides the flow identifiers and the corresponding selected network parameters to the routers 16*b*, 16*c*, and 16*d*, enabling enforcement of the selected quality of service parameters along the entire path 22*a*.

In contrast, the content engine 24 may specify a different quality of service, for example based on localized caching using content acceleration techniques, enabling a more economical flow of data packets from the server 12 by a path 22*b* (e.g., via the routers 16*a*, and 16*b*).

FIG. 1 also illustrates that the transfer of the identified flow of data packets by the application server 12 also may be performed, according to the selected network parameters, via either a private network 24, for example a local content—network service provider, or via a public wide area network 26, for example the Internet, depending on availability for a client device. In the case of content delivery via a public network 26, the server 12 may direct the flow of data packets to the public network 26 via an edge server 18. Private networks such as the LAN 14 and the WAN 27 also may "overlay" the public wide area network 26, for example by utilizing the public wide area network 26 as a "backbone" for transfer of data between the server 12 and the client device 20*b* via the edge server 18, and the routers 16*e*, 16*j*, 16*h*, 16*g*, and 16*k*. Hence, the LAN 14, the public network 26 and the WAN 27 may be utilized to establish a virtual private network (VPN) between the client device 20*b* and the server 12.

As illustrated in FIG. 1, the server 12, the router 16*a* and the edge server 18 are part of the same local area network 14, implemented for example using IEEE 802.3 data links. The edge server 18 forwards the flow of data packets to a router 16*e* having a presence on wide area network 26, enabling the flow of data packets from the server 12 to be delivered to a client device 20*c* via a path 22*c* formed by transfer of the flow of data packets between the edge server 18 and the routers 16*e* and 16*f*. As described above, the edge server 18 may be configured for determining the quality of service attributes based on parsing the XML tags within a message, described in further detail below with respect to FIGS. 3A and 3B. Once the edge server 18 has parsed the XML tags to determine the quality of service attributes for the corresponding application service, the edge server 18 selects the network parameters to be used for the identified flow of data packets, and forwards the necessary flow identifiers and corresponding network parameters to the routers 16*e* and 16*f* along the path 22*c*, enabling enforcement of the selected quality of service parameters based on implementation of the selected network parameters.

FIG. 1 also illustrates how the server 12 may issue XML based directives for routers to redirect traffic for subsequent requests from a client device. For example, the server 12, in response to receiving the requests from the client device 20*b*, may issue an HTTP redirect request that includes an XML directive based on geographic proximity, requesting that subsequent requests by the client device 20*b*, or other devices having the same geographic proximity as the client device 20*b*, be redirected to the server 12'. In this case, the router 16*g*, upon receiving the redirect request, parses the XML tags and caches the server directives based on geographic proximity, enabling the subsequent requests sent from the client 20*b* to be automatically redirected by the router 16*g* to the server 12', relieving the server 12 of generating additional redirect requests.

FIG. 2 is a block diagram illustrating a network node, for example a router 16 or an edge server 18, configured for classifying content based on mapping quality of service attributes for an application service to selected network parameters for an identified flow of data packets, according to an embodiment of the present invention. For ease in illustration, the network node of FIG. 2 will be described with reference to the router 16, however all operations and features described herein also apply to the edge server 18.

The router 16 includes a network interface 40 configured for sending and receiving data packets according to an open network protocol, for example TCP/IP, UDP, SIP, etc., utilizing a layer 4 interface 46, a layer 3 interface 48, and a layer 2 interface 50. The network node also includes an XML module 42 configured for parsing XML tags carried by the data packets, and executing network based operations based on interpreting the XML tags. In particular, the XML module 42 includes an XML parser 44 configured for parsing the XML tags, and an application resource module 47 configured for interpreting the XML tags and executing the associated operations.

The application resource module 47 includes a context engine 48 configured for interpreting the XML tags based on context information specified within an XML library 50. The XML library 50 includes information for interpreting the parsed XML tags (e.g., client-selected Qos attributes, server directives), enabling the context engine 48 to interpret the quality of service attributes specified by the XML tags, and enabling the context engine 48 to identify and select network parameters that need to be executed for the identified qualities of service attributes.

The application resource module 47 also includes a set of application programming interfaces (APIs) 52 configured for requesting execution of selected network parameters as identified and selected by the context engine during parsing of the XML tags. For example, the context engine 48 may call a network-specific API 52 for enforcement of network parameters based on layer 4, layer 3, or layer 2 quality of service mechanisms. For example, certain APIs 52 may be configured for directing layer 3 quality of service routines by a layer 3 interface 48 based on available protocols, for example IP precedence, IP quality of service (e.g., CAR, WRED, WFQ), DIFF SERV, or RSVP. Layer 2 services executable by a layer 2 interface 50 also may be accessed by the API 52, for example generic traffic shaping (GTS), or 802.1x priority mechanisms. In addition, separate API's may be utilized for multiple layer protocol level services (MPLS 54) for traversal of edge and core networks, which also may remapped to layer 2 and layer 3 quality of service mechanisms wherever necessary.

The application resource module 47 also includes a cache 56 of session flows, where flow identifiers necessary to identify the flow of data packets associated with an application service for a specific user session having corresponding selected quality of service attributes are mapped to the selected network parameters. Hence, once the application resource 47 has parsed the XML tags and identified the network parameters necessary for providing the selected quality of service, the application resource 47 caches the flow identifiers and corresponding network parameters in the cache 56, enabling the application resource 47 to determine the network parameters for subsequent received data packets based on accessing the cache 56 using the flow identifiers.

Figure 3A:
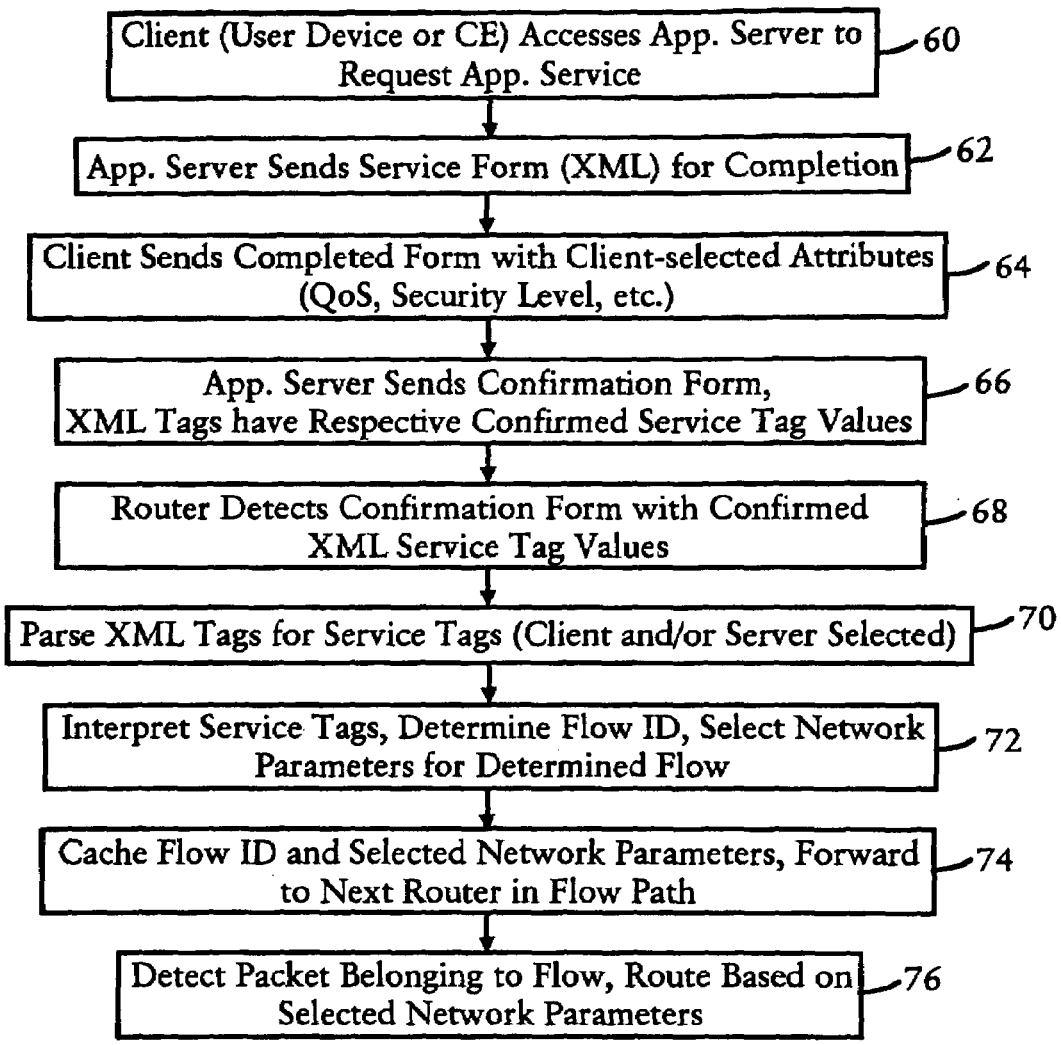
FIGS. 3A and 3B are diagrams summarizing methods for providing XML based content classification and acceleration of an identified flow of data packets for an application service based on client-selected quality of service attributes and server directives, respectively, according to an embodiment of the present invention.
Figure 3B:
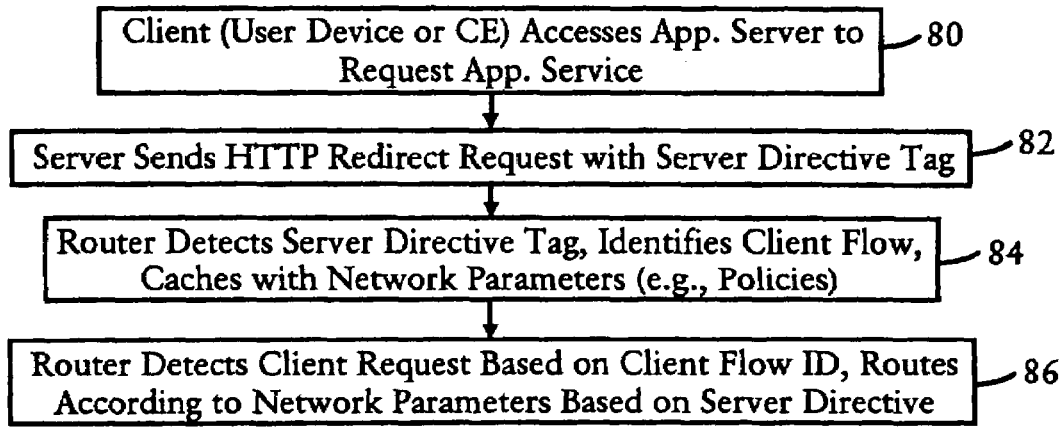

FIGS. 3A and 3B are diagrams summarizing methods for establishing and enforcing quality of service parameters for application services based on mapping the selected quality of service parameters to network parameters along the path of the data flow 22, according to an embodiment of the present invention. The steps described in FIGS. 3A and 3B can be implemented as executable code stored on a computer readable medium (e.g., a hard disk drive, a floppy drive, a random access memory, a read only memory, an EPROM, a compact disc, etc.).

The method begins in step 60, where a client device, for example a subscriber device 20 or a content engine 24, accesses the application server 12 to request an application service, for example a video on demand movie request. The application server 12 sends in step 62 a service form, generated based on utilizing prescribed XML tags, for completion by the client device. For example, the service form may include a table that includes available quality of service parameters that may be selected by the user, where each quality of service parameter is defined by a prescribed XML tag. The service form also may include additional fields for completion by the user, for example a subscriber identifier to validate subscription services, a destination device option for identifying the actual destination device for the services, billing or authentication information, desired security parameters, etc.

The service form is completed and sent in step 64 by the client device to the server 12 for validation. In the case of a user device 20, the user may manually select available options displayed on the service form; in the case of a content engine 24, the content engine may dynamically complete the service form by assigning selected values to the service parameters. In either case, the service form sent in step 64 includes XML tags having certain values that specify the selected quality of service parameters. The application server 12 validates in step 66 the selected quality of service parameters, for example by authenticating the subscriber, verifying the subscriber is authorized to request the selected quality of service parameters, etc., and sends a confirmation form that includes XML tags that specify the confirmed service tag values representing the quality of service requirements and any server directives. In addition, the service tag values may specify prescribed application-specific quality of service attributes that may require multiple levels of network parameters (e.g., high bandwidth connection with high security encryption and low latency).

Hence, the confirmation form sent in step 66 includes all the parameters necessary for the routers 16 to determine the quality of service parameters and server directives to be enforced. The confirmation form also will specify the flow identifiers for identifying the flow of data packets associated with the application service according to the selected quality of service attributes. Hence, the routers 16 can parse the XML types within the confirmation form to identify the quality of service parameters specified for an application service, which may be as specific as a specific instance on a specific client device, identified by IP address and/or by client device number (e.g., MAC address). The confirmation form also may specify the flow identifiers, which may include source and destination IP addresses, as well as other higher level identifiers, enabling the routers to identify the precise source and destination devices. As a result, the server 12 may be able to generate a confirmation form enabling the routers 16 to prepare to accept a flow of data packets from another server (e.g., server 12'), for delivery of different flows for separate instances executing on the client device 20b.

The router 16 detects the confirmation form with the confirmed XML service tag values in step 68, and parses the XML tags in step 70 using its XML parser 44. Typically the router closest to the server 12 having generated the confirmation form parses the XML tags to determine the network parameters, and determine network parameters for other routers along the flow, minimizing the necessity for other routers 16 to perform the same XML based processing.

The router 16 interprets in step 72 the service tags using its context engine 48 based on the prescribed XML tags specified within the XML library 50. The context engine 48 then selects the network parameters for the determined flow of data packets in step 72, and caches in step 74 the flow identifiers and the selected network parameters into the internal cache 56. The flow identifiers and selected network parameters are cached for a duration based on an application level timeout, ensuring that the cached parameters are available even if the packets associated with the flow may encounter a delay during transmission: the application level timeout itself may be an attribute specified by an XML tag provided by the server.

The context engine 48 also forwards the cached flow identifiers and network parameters for the identified flow of data packets to other routers along the flow path 22, enabling each of the routers to enforce the quality of service parameters for the application service to the destination for the specified session. The flow identifiers and selected network parameters may be forwarded in the form of an explicit message to the subsequent routers requesting implementation of the selected network parameters for the packet flows having the supplied flow identifiers. Instead of forwarding the cached flow identifiers and network parameters for the identified flow of data packets, the context engine 48 also could change existing network header fields (e.g., IP header Type of Service (TOS) field, layer 4 header fields, etc.) of a received data packet to identify the selected network parameters, enabling subsequent routers to detect the selected network parameters by parsing the changed network header fields. Other quality of service enforcement mechanisms (e.g., RSVP, DIFFSERV Code Point, etc.,) may be utilized by the routers to implement the attributes specified by the XML tags.

Once the routers 16 have cached the flow identifiers and selected network parameters, the routers can identify subsequent received data packets belonging to the identified flow of data packets in step 76, and route the identified flow of data packets according to the selected network parameters without additional XML processing necessary.

FIG. 3B is a flow diagram illustrating in further detail the processing of server directives by the router 16. Note, however, that typically the router 16 may process client selected quality of service attributes concurrently with server directive. Typically a client device accesses the application server 12 in step 80 to request an application service. For example, consider the client device 20*b* located in India sending the request to the server 12 located in San Jose, Calif. The server 12 sends in step 82 an HTTP redirect request that includes an XML based server directive tag. The server directive tag may include XML based geographic proximity tags that specify geographic locations for which requests should be redirected. The router 16 detects in step 84 the server directive tag, identifies the client flow of data packets, and caches the identified client flow with the network parameters that implement the policies directed by the server 12. For example, the server 12 may specify that client devices located in India and surrounding geographic regions should be redirected to the server 12', located for example in Singapore. The router 16, upon detecting in step 86 another client request based on the client full identifier, routes the request according to the cached network parameters to the geographically preferred server 12' based on the server directory. Hence, client traffic can be redirected without the necessity of additional server processing, and without the necessity of data structure stored on the client device (e.g., cookies).

According to the disclosed embodiment, end-to-end network services realization (e.g., quality of service, server directives) can be implemented based on XML based content classification. Hence, intermediate nodes such as routers, gateways, edge devices, etc. can detect and enforce policies selected by end points (e.g., client or server devices), without the necessity of out of band signaling. Moreover, services realization can be precisely controlled for application service sessions based on mapping flow identifiers to determine network parameters.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A network node comprising:
   a network interface configured for transferring an identified flow of data packets, associated with an application service and having been output by an application server, toward a destination device according to an open network protocol and based on selected network parameters, the network interface further configured for transferring between the application server and the destination device at least one message having XML tags specifying prescribed user-selected quality of service attributes for the application service, the network node distinct from the destination device and the application server;
   an extensible markup language (XML) parser configured for parsing the XML tags for the prescribed user-selected quality of service attributes; and
   an application resource configured for interpreting the XML tags and the prescribed user-selected quality of service attributes and selecting the selected network parameters based on the interpreting of the prescribed user-selected quality of service attributes, causing the network interface to transfer the identified flow of data packets for the application service between the application server and the destination device according to the user-selected quality of service attributes based on the selected network parameters.

2. The network node of claim 1, wherein the XML tags within the at least one message are based on a group of predetermined XML tags specifying respective prescribed quality of service attributes identifiable by the application resource, the application resource configured for selecting, for each corresponding predetermined XML tag, a corresponding prescribed network parameter for implementation of the corresponding prescribed quality of service attribute.

3. The network node of claim 2, wherein the application resource is configured for identifying the flow of data packets for transfer according to the selected network parameters based on flow information specified within the at least one message for the corresponding application service.

4. The network node of claim 3, wherein the XML parser parses the XML tags within the at least one message independent of any destination node identifier field within the at least one message.

5. The network node of claim 4, wherein the at least one message represents an approval message from the application server and destined for the destination device indicating delivery of the application service according to the prescribed user-selected quality of service attributes.

6. The network node of claim 1, wherein the application resource is configured for caching the selected network parameters and identifiers for identification of subsequent packets received for the identified flow of data packets and outputting according to the selected network parameters.

7. The network node of claim 6, wherein the application resource is configured for assigning the selected network parameters to the subsequent packets received for the identified flow of data packets based on the cached selected network parameters and identifiers, independent of the XML tags specifying the prescribed user-selected quality of service attributes within the subsequent packets.

8. The network node of claim 6, wherein the network interface is configured for outputting the cached selected network parameters and identifiers to another network node along a path utilized by the network node for transferring the identified flow of data packets between the application server and the destination device.

9. The network node of claim 1, wherein the XML tags include service tags that specify the prescribed user-selected quality of service attributes based on at least any one of minimum bandwidth, maximum bandwidth, latency, security level, destination device identity, destination device location, application service instance, and or user authentication level.

10. The network node of claim 1, wherein the network node is configured as any one of a router of an open protocol network, and or an edge server of a private network.

11. The network node of claim 1, wherein the message further includes second XML tags specifying prescribed application server-selected service attributes for the corresponding application service, based on a group of predetermined server-selected XML tags specifying respective service attributes identifiable by the application resource, the application resource configured for selecting, for each corresponding predetermined server-selected XML tag, a corresponding prescribed network parameter for implementation of the corresponding service attribute.

12. The network node of claim 11, wherein the application resource is configured for assigning, based on reception of a server-selected XML tag specifying a geographical proximity attribute, a corresponding network parameter for redirecting data packets from the destination device to a second user based on geographical location information within the data packets from the destination device.

13. A method in a network node, the method comprising:
receiving by the network node, for transfer between an application server configured for outputting a flow of data packets associated with an application service and a destination device configured for receiving the flow of data packets, a message having XML tags specifying prescribed user-selected quality of service attributes for the application service, the network node distinct from the destination device and the application server;
parsing by the network node the XML tags for determining the prescribed user-selected quality of service attributes;
selecting network parameters by the network node, based on the network node interpreting the XML tags and the prescribed user-selected quality of service attributes, enabling the flow of data packets to be transferred for the application service according to the user-selected quality of service attributes; and
identifying and transferring by the network node the flow of data packets between the application server and toward the destination device according to an open network protocol and the selected network parameters.

14. The method of claim 13, wherein the XML tags within the at least one message are based on predetermined XML tags specifying respective prescribed quality of service attributes, the selecting including selecting the corresponding prescribed network parameter for each parsed XML tag for implementation of the corresponding prescribed quality of service attribute.

15. The method of claim 14, wherein the identifying includes identifying the flow of data packets for transfer according to the selected network parameters based on flow information specified within the at least one message for the corresponding application service.

16. The method of claim 15, wherein the parsing includes parsing the XML tags within the at least one message independent of any destination node identifier field within the at least one message.

17. The method of claim 16, wherein the at least one message represents an approval message from the application server and destined for the destination device indicating delivery of the application service according to the prescribed user-selected quality of service attributes.

18. The method of claim 13, further comprising the network node caching the selected network parameters and identifiers for identification of subsequent packets received for the identified flow of data packets and outputting according to the selected network parameters.

19. The method of claim 18, wherein the selecting includes assigning the selected network parameters to the subsequent packets received for the identified flow of data packets based on the cached selected network parameters and identifiers, independent of the XML tags specifying the prescribed user-selected quality of service attributes within the subsequent packets.

20. The method of claim 18, further comprising the network node outputting the cached selected network parameters and identifiers to another network node along a path utilized by the network node for transferring the identified flow of data packets between the application server and the destination device.

21. The method of claim 13, further comprising the network node interpreting, from the XML tags, service tags that specify the prescribed user-selected quality of service attributes based on at least any one of minimum bandwidth, maximum bandwidth, latency, security level, destination device identity, destination device location, application service instance, and or user authentication level.

22. The method of claim 13, wherein the network node is configured as any one of a router of an open protocol network, and or an edge server of a private network.

23. The method of claim 13, wherein the message further includes second XML tags specifying prescribed application server-selected service attributes for the corresponding application service, based on a group of predetermined server-selected XML tags specifying respective service attributes identifiable by an application resource executed in the network node, the selecting including selecting, for each corresponding predetermined server-selected XML tag, a corresponding prescribed network parameter for implementation of the corresponding service attribute.

24. The method of claim 23, wherein the selecting includes assigning, based on reception of a server-selected XML tag specifying a geographical proximity attribute, a corresponding network parameter for redirecting data packets from the destination device to a second user based on geographical location information within the data packets from the destination device.

25. A computer readable medium having stored thereon sequences of executable instructions, the sequences of instructions including instructions for performing the steps of:
receiving by a network node, for transfer between an application server configured for outputting a flow of data packets associated with an application service and a destination device configured for receiving the flow of data packets, a message having XML tags specifying prescribed user-selected quality of service attributes for the application service, the network node distinct from the destination device and the application server;

parsing by the network node the XML tags for determining the prescribed user-selected quality of service attributes;

selecting network parameters by the network node, based on the network node interpreting the XML tags and the prescribed user-selected quality of service attributes, enabling the flow of data packets to be transferred for the application service according to the user-selected quality of service attributes; and identifying and transferring by the network node the flow of data packets between the application server and toward the destination device according to an open network protocol and the selected network parameters.

26. The medium of claim 25, wherein the XML tags within the at least one message are based on predetermined XML tags specifying respective prescribed quality of service attributes, the selecting including selecting the corresponding prescribed network parameter for each parsed XML tag for implementation of the corresponding prescribed quality of service attribute.

27. The medium of claim 26, wherein the identifying includes identifying the flow of data packets for transfer according to the selected network parameters based on flow information specified within the at least one message for the corresponding application service.

28. The medium of claim 27, wherein the parsing includes parsing the XML tags within the at least one message independent of any destination node identifier field within the at least one message.

29. The medium of claim 28, wherein the at least one message represents an approval message from the application server and destined for the destination device indicating delivery of the application service according to the prescribed user-selected quality of service attributes.

30. The medium of claim 25, further comprising instructions for the network node caching the selected network parameters and identifiers for identification of subsequent packets received for the identified flow of data packets and outputting according to the selected network parameters.

31. The medium of claim 30, wherein the selecting includes assigning the selected network parameters to the subsequent packets received for the identified flow of data packets based on the cached selected network parameters and identifiers, independent of the XML tags specifying the prescribed user-selected quality of service attributes within the subsequent packets.

32. The medium of claim 30, further comprising instructions for the network node outputting the cached selected network parameters and identifiers to another network node along a path utilized by the network node for transferring the identified flow of data packets between the application server and the destination device.

33. A network node comprising:

means for receiving, for transfer between an application server configured for outputting a flow of data packets associated with an application service and a destination device configured for receiving the flow of data packets, a message having XML tags specifying prescribed user-selected quality of service attributes for the application service, the network node distinct from the destination device and the application server;

means for parsing the XML tags for determining the prescribed user-selected quality of service attributes; and means for selecting network parameters, based on the means for selecting interpreting the XML tags and the prescribed user-selected quality of service attributes, enabling the flow of data packets to be transferred for the application service according to the user-selected quality of service attributes;

means for identifying and transferring the flow of data packets between the application server and toward the destination device according to an open network protocol and the selected network parameters.

34. The network node of claim 33, wherein the XML tags within the at least one message are based on predetermined XML tags specifying respective prescribed quality of service attributes identifiable by the application resource, the selecting means configured for selecting the corresponding prescribed network parameter for each parsed XML tag for implementation of the corresponding prescribed quality of service attribute.

35. The network node of claim 34, wherein the identifying means is configured for identifying the flow of data packets for transfer according to the selected network parameters based on flow information specified within the at least one message for the corresponding application service.

36. The network node of claim 35, wherein the parsing means is configured for parsing the XML tags within the at least one message independent of any destination node identifier field within the at least one message.

37. The network node of claim 36, wherein the at least one message represents an approval message from the application server and destined for the destination device indicating delivery of the application service according to the prescribed user-selected quality of service attributes.

38. The network node of claim 33, further comprising means for caching the selected network parameters and identifiers for identification of subsequent packets received for the identified flow of data packets and outputting according to the selected network parameters.

39. The network node of claim 38, wherein the selecting means is configured for assigning the selected network parameters to the subsequent packets received for the identified flow of data packets based on the cached selected network parameters and identifiers, independent of the XML tags specifying the prescribed user-selected quality of service attributes within the subsequent packets.

40. The network node of claim 38, further comprising means for outputting the cached selected network parameters and identifiers to another network node along a path utilized by the network node for transferring the identified flow of data packets between the application server and the destination device.

41. The network node of claim 33, wherein the selecting means include means for interpreting, from the XML tags, service tags that specify the prescribed user-selected quality of service attributes based on at least any one of minimum bandwidth, maximum bandwidth, latency, security level, destination device identity, destination device location, application service instance, and or user authentication level.

42. The network node of claim 33, wherein the network node is configured as any one of a router of an open protocol network, and or an edge server of a private network.

43. The network node of claim 33, wherein the message further includes second XML tags specifying prescribed application server-selected service attributes for the corresponding application service, based on a group of predetermined server-selected XML tags specifying respective service attributes identifiable by the parsing means, the selecting means configured for selecting, for each corresponding predetermined server-selected XML tag, a corresponding prescribed network parameter for implementation of the corresponding service attribute.

44. The network node of claim 43, wherein the selecting means is configured for assigning, based on reception of a server-selected XML tag specifying a geographical proximity attribute, a corresponding network parameter for redirecting data packets from the destination device to a second user based on geographical location information within the data packets from the destination device.

45. The network node of claim 1, wherein the destination device is configured for presenting the application service to a subscriber.

46. The method of claim 13, wherein the destination device is configured for presenting the application service to a subscriber.

47. The medium of claim 25, wherein the destination device is configured for presenting the application service to a subscriber.

48. The network node of claim 33, wherein the destination device is configured for presenting the application service to a subscriber.

\* \* \* \* \*